No. 622,593. Patented Apr. 4, 1899.
A. A. BISHOP.
VEHICLE WHEEL.
(Application filed Jan. 27, 1899.)
(No Model.)
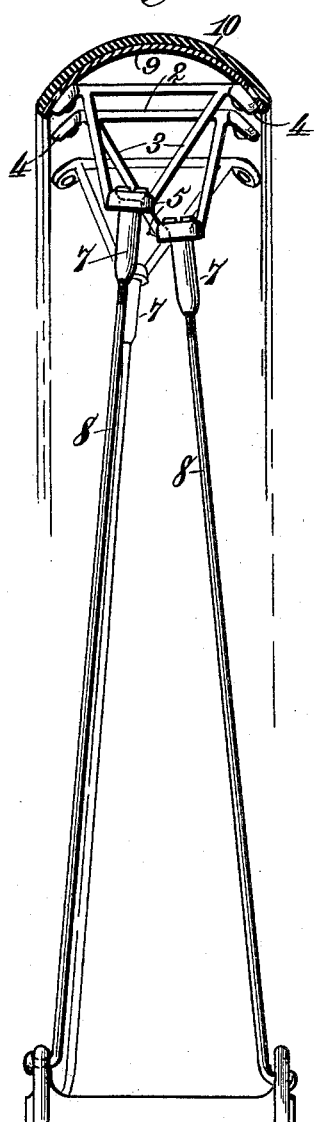
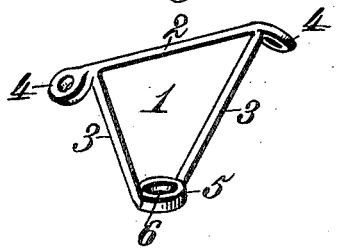
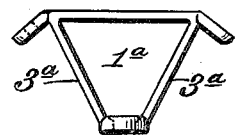
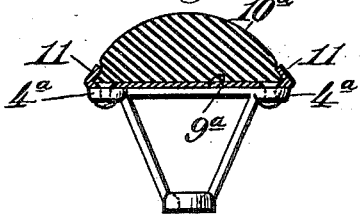
Witnesses:
Robert Everitt.
F. B. Keefer.
Inventor:
Augustus A. Bishop.
By James L. Norris
Att'y.
THE NORRIS PETERS CO., PHOTO-LITHO., WASHINGTON, D. C.

UNITED STATES PATENT OFFICE.

AUGUSTUS A. BISHOP, OF WASHINGTON, DISTRICT OF COLUMBIA.

VEHICLE-WHEEL.

SPECIFICATION forming part of Letters Patent No. 622,593, dated April 4, 1899.

Application filed January 27, 1899. Serial No. 703,601. (No model.)

*To all whom it may concern:*

Be it known that I, AUGUSTUS A. BISHOP, a citizen of the United States, residing at Washington, in the District of Columbia, have invented new and useful Improvements in Vehicle-Wheels, of which the following is a specification.

My invention relates to vehicle-wheels, the same residing particularly in the construction of the rim or felly and the means of connecting it to the spokes. The same is particularly designed for use upon bicycles and other vehicles on which the pneumatic tire is now commonly employed, although it is of course capable of a much wider range of use.

The invention consists of a wheel comprising a hub and spokes, a series of triangular brackets having lips or projections thereon and provided with means whereby the spokes may be attached, and a rim which is secured along its side edges to the projecting lips on said brackets, the said rim being covered, if desired, with a tire of rubber or other equivalent material.

The invention also consists in certain other details of construction and combinations of parts, which will be hereinafter more fully described and claimed.

In the drawings forming part of this specification, Figure 1 is a partial sectional view of a wheel constructed in accordance with my invention. Fig. 2 is a detail perspective view of one of the brackets. Fig. 3 is an elevation of a modified form of bracket, and Fig. 4 is a detail sectional view of another modification.

Like reference-numerals indicate like parts in the different views.

In carrying out my invention I employ a series of substantially triangular brackets 1 1, the outer bar 2 of each of which is extended beyond the converging side bars 3 3 to form lips or projections 4 4, which are preferably bent downwardly or inwardly out of line with the bar 2. The apex or inner end of each of the brackets 1 is flattened, as shown at 5, and provided with an opening 6 for the reception of the fastening and tightening thimble 7, by means of which the spokes 8 are connected to said brackets. The inner ends of said spokes may be connected to the hub of the wheel in any suitable manner. The rim or felly 9 may be made of metal, wood, or other suitable resilient material which is capable of standing the strain to which the same will be subjected, and is curved transversely, forming an outer convex and an inner concave surface. The side edges of said rim are secured by bolts, rivets, or other analogous devices to the projecting lips 4 of the brackets 1. By this means the radial pressure upon the rim of the wheel will be converted into lateral pressure toward the sides of said rim, which will be resisted by said brackets. The outer surface of the rim 9 may be covered with a strip 10 of rubber or other like material, forming a yielding tread-surface for the wheel and one which will prevent slipping.

In the form of my invention shown in Figs. 1 and 2 of the drawing the brackets 1 have the side bars 3 thereof of unequal lengths. This form of bracket is to be employed when the spokes 8 are secured to end flanges on the wheel-hub, as is the common construction in bicycle-wheels at the present time, and in such case the brackets will be arranged alternately, as illustrated in Fig. 1 of the drawings. When, however, the spokes are secured centrally to the hub and extend outwardly in the same plane, the form of bracket 1ª (illustrated in Fig. 3 of the drawings) will be employed, wherein it will be observed that the side bars 3ª are of equal length and the brackets themselves are of substantially the shape of an equilateral or isosceles triangle.

In the modified form of my invention illustrated in Fig. 4 of the drawings the side lips 4ª of the brackets extend laterally in line with the outer bars, and to these are secured the rim or felly 9ª, which instead of being curved in cross-section is flat. The side edges of the felly 9ª are formed with outwardly-extending converging flanges 11, between which the tire 10ª, of block rubber or other suitable material, is secured in place.

By the construction described I have produced a simple, cheap, and effective wheel for use on bicycles and other light vehicles which overcomes many of the objections to the old form of wheels and tires and possesses additional features of advantage which will be readily appreciated by those familiar with this class of invention. Such a wheel is strong and durable and at the same time provides a resilient yielding bearing-surface which does not require inflation, and consequently cannot be rendered inoperative by reason of punctures.

Having thus described my invention, what I claim is—

1. In a wheel, the combination with the spokes, of a series of brackets secured to the spokes, and a rim secured along its side edges to said brackets, having its intermediate portions free and constructed and arranged to exert lateral pressure on said brackets.

2. In a wheel, the combination with the spokes, of a series of brackets secured to said spokes, and a transversely-curved rim secured along its side edges to said brackets, having its intermediate portions free and arranged to exert lateral pressure on said brackets.

3. In a wheel, the combination with the spokes, of a series of triangular brackets secured to said spokes and provided with lips or projections extending beyond the sides of said brackets and bent inwardly toward the hub, and a transversely-curved rim secured along its side edges to said lips.

4. In a wheel, the combination with the spokes, of a series of triangular brackets having openings at their apexes for the attachment of the spokes and lips or projections extending beyond the sides of said brackets, and a rim secured along its side edges to said lips.

5. In a wheel, the combination with the spokes thereof, of a series of triangular brackets having the apexes thereof flattened and provided with openings for the reception and attachment of said spokes, and with lips or projections extending beyond the sides of said brackets and curved inwardly, and a transversely-curved rim secured along its side edges to said lips.

6. In a wheel, the combination with the spokes thereof which alternately extend from points on the hub in different planes, of a series of triangular brackets secured to said spokes, each having one of the side bars thereof longer than the other and arranged alternately, and a transversely-curved rim secured along its side edges to said brackets.

In testimony whereof I have hereunto set my hand in presence of two subscribing witnesses.

AUGUSTUS A. BISHOP.

Witnesses:
GEO. W. REA,
F. B. KEEFER.